United States Patent
Young

(10) Patent No.: US 9,858,656 B2
(45) Date of Patent: Jan. 2, 2018

(54) VIDEO INTERPRETABILITY AND QUALITY ESTIMATION

(71) Applicant: Raytheon Company, Waltham, MA (US)

(72) Inventor: Darrel L. Young, Falls Church, VA (US)

(73) Assignee: Raytheon Company, Waltham, MA (US)

( * ) Notice: Subject to any disclaimer, the term of this patent is extended or adjusted under 35 U.S.C. 154(b) by 1032 days.

(21) Appl. No.: 13/801,549

(22) Filed: Mar. 13, 2013

(65) Prior Publication Data
US 2014/0267381 A1 Sep. 18, 2014

(51) Int. Cl.
*G06K 9/00* (2006.01)
*G06T 7/00* (2017.01)
*H04N 17/00* (2006.01)

(52) U.S. Cl.
CPC ......... *G06T 7/0002* (2013.01); *H04N 17/004* (2013.01); *G06T 2207/30168* (2013.01)

(58) Field of Classification Search
CPC ....... G06F 17/00; H04N 17/02; G06T 7/0002; G06T 2207/30168
See application file for complete search history.

(56) References Cited

U.S. PATENT DOCUMENTS

| | | | | |
|---|---|---|---|---|
| 6,577,764 B2* | 6/2003 | Myler | ................... | G06T 7/0004 348/180 |
| 7,889,211 B2* | 2/2011 | Ferguson | ............... | H04N 17/02 345/426 |
| 8,154,602 B2* | 4/2012 | Yamagishi | ........... | H04N 17/004 348/192 |
| 8,320,747 B2* | 11/2012 | Ushiki | ................... | H04N 17/00 382/232 |
| 2003/0031368 A1* | 2/2003 | Myler | ................... | G06T 7/0004 382/228 |
| 2003/0193511 A1* | 10/2003 | Ferguson | ............... | H04N 17/02 345/604 |
| 2007/0206095 A1* | 9/2007 | Kawada | ................. | H04N 17/02 348/192 |
| 2008/0025402 A1* | 1/2008 | Lee | ...................... | H04N 19/172 375/240.16 |
| 2009/0225170 A1* | 9/2009 | Yamagishi | ........... | H04N 17/004 348/192 |
| 2010/0166388 A1* | 7/2010 | Ushiki | ................... | H04N 17/00 386/241 |

(Continued)

OTHER PUBLICATIONS

Griffith, D., General Image Quality Equation, 2012, National Geospatial-Intelligence Agency, Slidse 1-26.*

(Continued)

*Primary Examiner* — Jonathan S Lee

(57) ABSTRACT

According to embodiment, an interpretability and quality estimation method includes generating an interpretability or quality estimate for an image or frame using one or more feature characteristics of a reference image when a reference image associated with an image is available or partially available, and generating an interpretability or quality estimate for the image or frame using one or more feature characteristics of the image when a reference image associated with the image is not available.

30 Claims, 2 Drawing Sheets

(56) References Cited

U.S. PATENT DOCUMENTS

2012/0201310 A1* 8/2012 Yamagishi ........... H04N 17/004
375/240.27
2017/0213331 A1* 7/2017 Chen ..................... G06T 7/0002

OTHER PUBLICATIONS

Irvine, J.M., Israel, S.A., Quantifying Interpretability Loss due to Image Compression, 2008, Applied Imagery Pattern Recognition Workshop 2008, pp. 1-8.*

Irvine, John M., Charles Fenimore, David Cannon, Donna Haverkamp, John Roberts, Steven A. Israel, Larry Simon, James Miller, Ana Ivelisse Aviles, and Michelle Brennan. "Development of a motion imagery quality metric." In Proceedings of the American Society for Photogrammetry and Remote Sensing (ASPRS) Annual Meeting, pp. 1-5. 2006.*

Irvine, John M., and Eric Nelson. "Image quality and performance modeling for automated target detection." In SPIE Defense, Security, and Sensing, pp. 73350L-73350L. International Society for Optics and Photonics, 2009.*

Irvine, John M., Charles Fenimore, David Cannon, John Roberts, Steven A. Israel, Larry Simon, Charles Watts et al. "Feasibility study for the development of a motion imagery quality metric." In Information Theory, 2004. ISIT 2004. Proceedings. International Symposium on, pp. 179-183. IEEE, 2004.*

Irvine, John M., David M. Cannon, Steven A. Israel, Gary O'Brien, Charles Fenimore, John Roberts, and Ana Ivelisse Aviles. "Quantifying interpretability for motion imagery: Applications to image chain analysis." In Information Fusion, 2007 10th International Conference on, pp. 1-8. IEEE, 2007.*

Motion Imagery Standards Board, MISB Engineering Guideline 1203.2, Oct. 2012, pp. 1-57.*

Motion Imagery Standards Board, MISB RP 0901, Oct. 2009, pp. 1-13.*

Motion Imagery Standards Board, MISB RP 1203.3, Feb. 2014, pp. 1-49.*

Motion Imagery Standards Board, MISB ST 0901.2, Feb. 2014, pp. 1-15.*

Young, Darrell L., Jeff Ruszczyk, and Tariq Bakir. "Video quality and interpretability study using SAMVIQ and Video-NIIRS." In IS&T/SPIE Electronic Imaging, pp. 78670W-78670W. International Society for Optics and Photonics, 2011.*

Young, Darrell, Tariq Bakir, Robert Butto Jr, Charles Duffield, and Fred Petitti. "Loss of interpretability due to compression effects as measured by the new video NIIRS." In IS&T/SPIE Electronic Imaging, pp. 75290V-75290V. International Society for Optics and Photonics, 2010.*

Young, Darrell L., and Tariq Bakir. "Cognitive modeling to predict video interpretability." In SPIE Defense, Security, and Sensing, pp. 80530M-80530M. International Society for Optics and Photonics, 2011.*

Young, Darrell L., and Charles Li. "Cognitive video quality analysis." In SPIE Defense, Security, and Sensing, pp. 87130Y-87130Y. International Society for Optics and Photonics, 2013.*

* cited by examiner

VIDEO INTERPRETABILITY AND QUALITY ESTIMATION

GOVERNMENT RIGHTS

This invention was made with U.S. Government support under subcontract number 88795CBS24 and prime contract number HM1582-06-C-0017 awarded by the Department of Defense. The U.S. Government may have certain rights in this invention.

TECHNICAL FIELD

This disclosure relates generally to video systems, and more specifically, to a video interpretability and quality estimation system and method using the same.

BACKGROUND

The use of imagery including still imagery and video imagery has become pervasive with the advent of computing systems capable of processing such imagery. Along with the expanded use of imagery has been a need and/or desire to quantify or otherwise estimate the quality of imagery. To this end, a Video National Imagery Interpretability Rating Scale (VNIIRS) has been developed. The Video NIIRS scale defines different levels of image quality/interpretability based on the types of tasks an analyst can perform with images of a given Video NIIRS rating. The overall concept is that imagery analysts should be able to perform more demanding interpretation tasks as the quality of the imagery increases. Video NIIRS differs from the well known still image NIIRS in that each criterion has an associated temporal activity component that requires video to accomplish.

SUMMARY

This disclosure provides a video interpretability and quality estimation system and method using the same.

According to embodiment, an interpretability and quality estimation method includes generating an interpretability or quality estimate for an image or frame using one or more feature characteristics of a reference image when a reference image associated with an image is available or partially available, and generating an interpretability or quality estimate for the image or frame using one or more feature characteristics of the image when a reference image associated with the image is not available.

Certain embodiments may provide various technical advantages depending on the implementation. For example, one embodiment can generate interpretability or quality estimates where either a full, a partial, or no reference is available.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
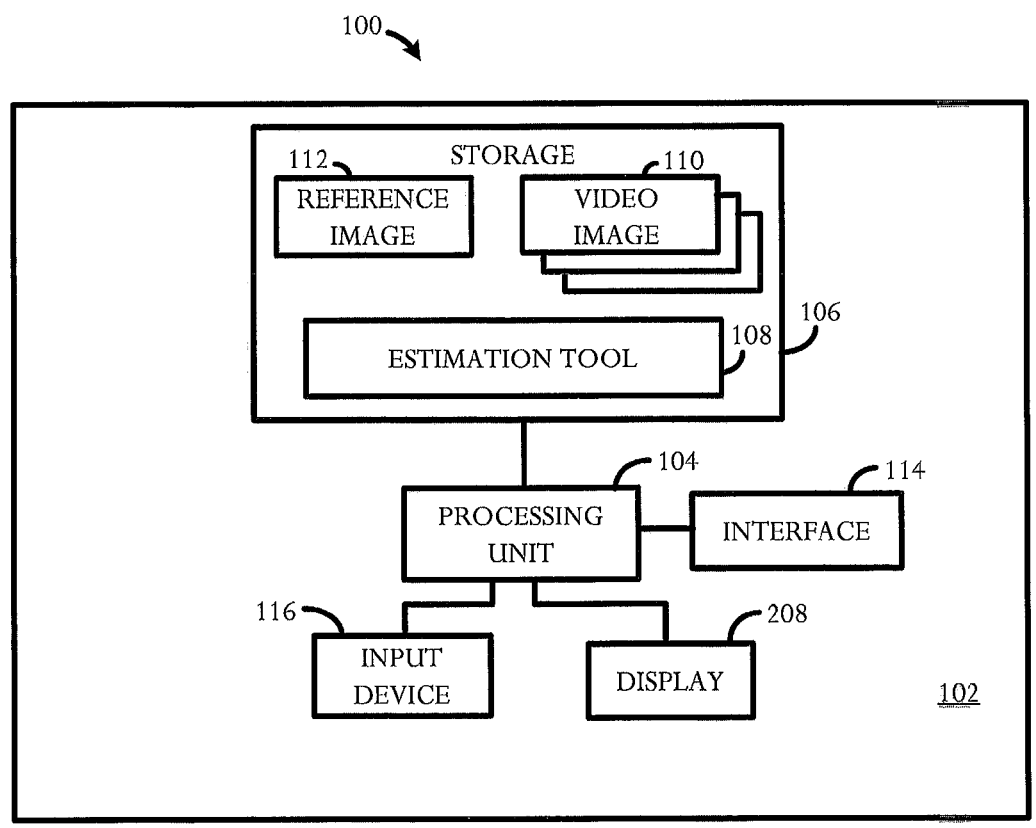
FIG. 1 illustrates an example estimation system according to an embodiment of disclosure.
Figure 2:
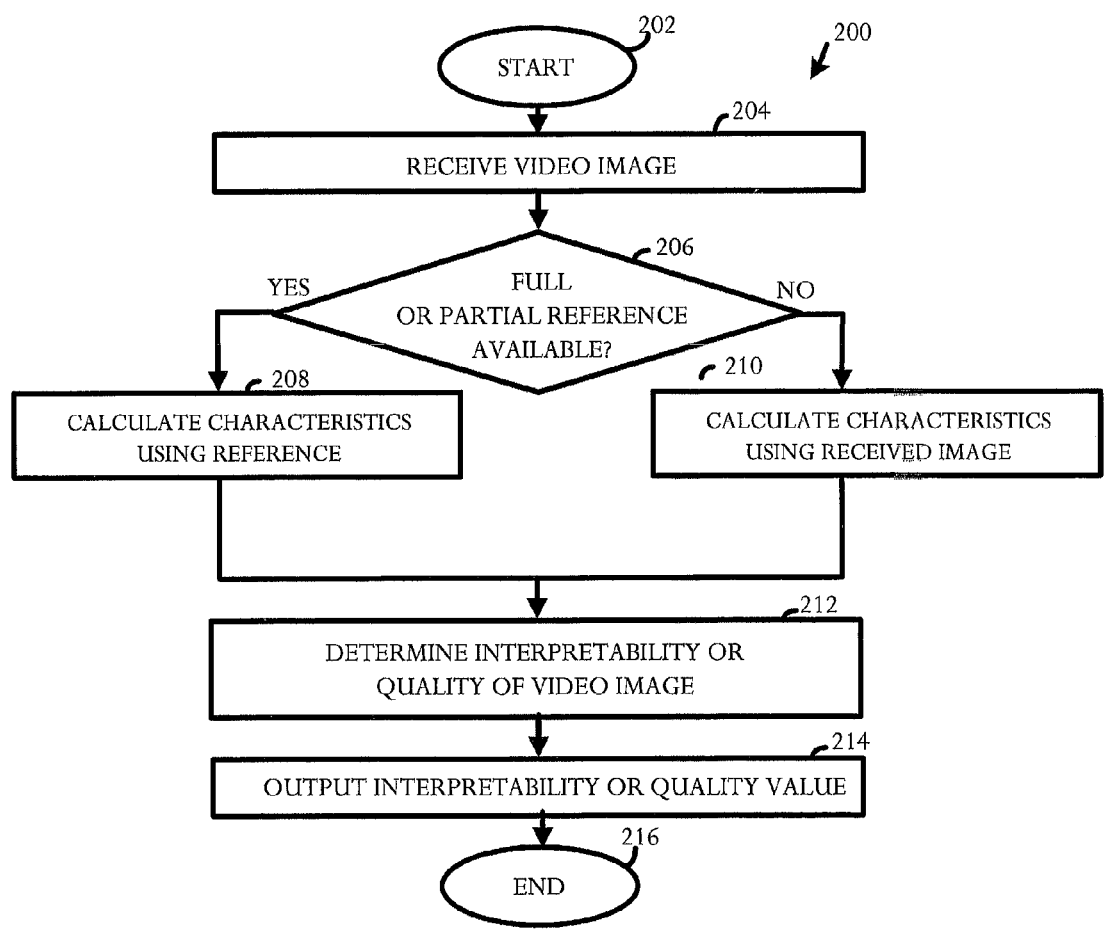
FIG. 2 illustrates an example interpretability and quality estimation process that may be performed by the estimation system of FIG. 1 according to this disclosure.

FIGS. 1 and 2, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

FIG. 1 illustrates an example estimation system 100, according to an embodiment of the disclosure. As described in more detail below, the estimation system 100 can be used for measurement and/or estimation of video interpretability and video quality. As shown in FIG. 1, the estimation system 100 includes a computing system 102 having one or more processing units 104 and one or more memory units 106. The memory unit 106 stores an estimation tool 108 that may be executed by the processing unit 104 to estimate an interpretability or quality of one or more frames or images 110 in a video stream. As will be described in more detail below, the tool 108 may generate estimates with or without a reference image 112. The computing system 102 may include any suitable type and number of components. In the particular example shown, the computing system 102 includes an interface 114, an input device 116, and an optional display 118.

The processing unit 104 represents any suitable processing device(s), such as a microprocessor, microcontroller, digital signal processor, application-specific integrated circuit, field programmable gate array, or other logic device. The memory unit 106 represents any suitable volatile and/or non-volatile storage and retrieval device(s), such as random access or read-only memory. The interface 114 represents any suitable interface for facilitating communication over one or more networks, such as an Ethernet interface or other electrical signal line interface or a wireless interface. The interface 114 can be used to receive imagery or to transmit imagery and associated interpretability estimates to other computing devices. The display 118 is optional and represents any suitable display device for presenting information to a user. The input device 116 represents any suitable device(s) for receiving input from a user, such as a keyboard or mouse.

The memory unit 106 stores the estimation tool 108 and may also store one or more images 110. The estimation tool 108 represents one or more computer programs defining how the computing system 102 generates interpretability values for the images. Other applications could also be stored on the memory unit 106 such as an application other features, such as functions for transmitting and/or receiving images from other computing systems.

Although FIG. 1 illustrates one example of a computing system 102 that generates interpretability estimates for imagery, various changes may be made. For example, the computing system 102 may include any other or additional components according to particular needs. Also, the computing system 102 may be implemented as a single, stand-alone system, or on multiple computing systems in communication with one another via a communication network. Moreover, in particular configurations, the estimation tool 108 may be stored as logic in hard-wired non-memory location.

Video quality metrics such as peak signal to noise ratio (PSNR) and/or a structural similarity index (SSIM) judge the relative quality performance of encoders/decoders. However, PSNR and SSIM either fail, or cannot be used for at least the following cases: (1) scenarios where no uncompressed reference is available; (2) scenarios where stabilization is required; (3) scenarios where contrast enhancement is needed; (4) scenarios requiring sharpening; (5) scenarios with super-resolution, upsampling, and downsampling because of size mismatch; (6) scenarios when an intelligence interpretability metric is called for; (8) scenarios where the fundamental limitation is inherent to the scene such as fog, haze, or smoke; and (9) scenarios when a metric is needed that takes advantage of existing metadata to analyze camera settings and motion Given such inabilities, certain video interpretability and quality measurement and prediction techniques disclosed herein address some, none, or all of the above situations where conventional metrics either are not suitable, or fail, or cannot be computed. Moreover, certain disclosure herein address situation where either full or partial references are available.

In general, interpretability measures the potential of the video for intelligence task completion while quality measures the overall appearance of the video. The Video National Imagery Interpretability Rating Scale (VNIIRS) specification (RP 0901) has interpretability levels ranging from 3 to 11. Spatial resolution is expressed by Ground Sample Distance (GSD). Temporal resolution is measured by sample frame rate.

In a military context, the VNIIRS specification identifies seven orders-of-battle: 1) Air Forces; 2) Electronics; 3) Ground Forces; 4) Missile; 5) Naval; 6) Culture; and 7) Security. Each order-of-battle has at least one task defined for each of the nine increasingly difficult levels. An example of the most difficult level for the Culture order-of-battle may include confirming the movement of a pedestrian's hands and fingers as they make change or sort coins in a busy open market or square. Achievement of interpreting this task usually requires relatively good spatial and temporal resolution. An example of a less difficult task (e.g., Air Forces order-of-battle) may include tracking the movement of an oversized container carried by a flatbed railcar in motion at a rail yard. In this case, much less spatial and temporal resolution may be required because the object is large and moving slowly. Although specific military context is given with reference to example embodiments, it should be understood that other non-military applications may also avail from embodiments of the disclosure.

Image quality as defined by the VNIIRS specification has five levels: 1. Bad; 2. Poor; 3. Fair; 4. Good; 5. Excellent. An excellent quality level means no observable artifacts or video defects over sustained viewing intervals of approximately 1 hour. Overall balance and clarity is exceptional. A good quality level means occasional artifacts are observed no more than once-per-minute. Edges and detail are consistently sharp and well contrasted. A fair quality level means consistent smooth video. Blurring and/or noise are barely noticeable. Annoyances and artifacts occur no more than twice-per-minute. A poor quality level means annoyances are observed every few seconds, or sustained impairments, such as blur or noise cause a noticeable and pronounced degradation. A bad video quality level means content is barely discernible due to near constant presence of impairments. A video quality set to zero indicates a forced setting that corresponds to the bad video quality level.

Interpretability and quality are generally considered to be functions of object size and distance; lighting condition, sun angle; motion (both camera and object); scene complexity (number of similar objects, and the like); task type (detection, recognition, identification, track); latency requirements (forensic or live); viewing angle, camera specifics (MTF, FPS, pixel count, and the like); calibration (white balance, non-uniformity correction, bad pixel maps, and the like); atmosphere effects (turbulence, fog, and the like); optics (mis-focus, aberrations, and the like); and artifacts due to compression and transmission.

FIG. 2 illustrates an example estimation process 200 that may be performed by the system 100 of FIG. 1, according to embodiments of the disclosure. The embodiment of the estimation process 200 shown in FIG. 2 is for illustration only. Other embodiments could be used without departing from the scope of this disclosure.

At step 204, the interpretability estimation system receives an image. The image may be a still image or a video image that is received in any suitable manner. For example, the image may be received from a remote location via the interface 114, or received from its internal storage.

In step 206, the estimation system determines whether a reference image or at least a partial reference image is available. If so, the processing continues at step 208 for calculation of characteristics with a reference or a partial reference. Otherwise, processing continues at step 210 for calculation of characteristics without a reference, for example, using a received image. Details of calculation at both steps 208 and 210 are provided below.

Video Interpretability

According to one embodiment, the estimation tool 108 may estimate an interpretability of imagery according to Equation 1 where $I_k$ represents the instantaneous interpretability estimate for the $k^{th}$ frame:

$$I_k = K\text{constant} - \log_2(GSD_k) - \log_2(1/RER_k) - \exp(D\text{constant}*(PSNR_c - PSNR_k)) - \Delta I_{camera} - \Delta I_{contrast} - \Delta I_{movers} - \Delta I_{artifacts} \qquad (\text{Eqn. 1})$$

As shown, Equation 1 is a function of resolution (ground sample distance—GSD), blur (relative edge response—RER), noise (peak signal to noise ratio—$PSNR_k$) in decibels (dB), camera/platform motion ($\Delta I_{camera}$), overall contrast ($\Delta I_{contrast}$), foreground contrast and motion ($\Delta I_{movers}$), and artifacts ($\Delta I_{artifacts}$). In some cases, Equation 1 may not account for non-standard viewing conditions, or playback frame rates other than the sample frame rate.

Additionally in some cases, artifacts in this equation are accounted for using the PSNR metric. The $\Delta I_{artifacts}$ coefficient in particular configurations is reserved for accounting for specific transmission losses, such as missing macroblocks. Addition details of each of these coefficients will be described below.

Kconstant is a constant value that maps the instantaneous interpretability estimate ($I_k$) to a known established specification. In one embodiment, Kconstant maps the instantaneous interpretability estimate ($I_k$) to the video NIIRS specification. In a particular embodiment, Kconstant is set to a value of '14'. In other embodiments, Kconstant may have other values greater than or less than 14.

Ground Sample Distance (GSD) generally refers to the geometric mean of the horizontal and vertical components in millimeters at the center of the frame. The reference benchmark of GSD is a NIIRS video quality level of '5' when GSD is 528 millimeters and all other motion image quality factors are high quality. The GSD for each of the VNIIRS video quality levels are shown in Table 1.

TABLE 1

Reference Video-NIIRS for high quality video.

| Video NIIRS | GSD (mm) | RER | pSNR | DI EFFECT SUBTRACTORS | | | |
|---|---|---|---|---|---|---|---|
| | | | | camera motion | scene contrast | mover discon. & contrast | artifacts |
| 3 | 2112 | 1 | 40 | 0 | 0 | 0 | 0 |
| 4 | 1056 | 1 | 40 | 0 | 0 | 0 | 0 |
| 5 | 528 | 1 | 40 | 0 | 0 | 0 | 0 |
| 6 | 264 | 1 | 40 | 0 | 0 | 0 | 0 |
| 7 | 132 | 1 | 40 | 0 | 0 | 0 | 0 |
| 8 | 66 | 1 | 40 | 0 | 0 | 0 | 0 |
| 9 | 33 | 1 | 40 | 0 | 0 | 0 | 0 |
| 10 | 17 | 1 | 40 | 0 | 0 | 0 | 0 |
| 11 | 8 | 1 | 40 | 0 | 0 | 0 | 0 |

Relative Edge Response (RER) generally refers to a measure of the sharpness of an image. As described more fully below, RER can be estimated using slanted-edge ISO method (ISO 12233:2000) if calibration is possible. When no calibration is possible, RER can be estimated using a partial-reference technique. Further, when no partial-reference technique is possible, RER can be estimated using a no-reference technique described below.

Dconstant is a digital cliff constant that has a range between 0.3 and 0.7. However, the value of the constant takes on relatively little importance when the kth frame ($PSNR_k$) is equal to $PSNR_c$. Smaller Dconstant values are used to describe systems that are robust to the digital cliff effect, meaning the fall-off in interpretability is gradual with decreasing PSNR. Larger Dconstant values indicate a more extreme digital cliff effect where the interpretability goes to zero very near the critical point $PSNR_c$ is the critical point near which digital video rapidly loses interpretability. Video approaching this point is dangerously near the digital cliff. In one embodiment, $PSNR_c$ may be set to be 27 dB. A typical range of $PSNR_c$ is between 26 and 29 dB. As described more fully below, for video with known reference (uncompressed or lightly compressed), PSNR can be estimated using the reference. When no reference is available, PSNR can be estimated using a partial-reference technique. Further, when no partial-reference technique is possible, PSNR can be estimated using the no-reference technique described below.

The use of reference-based techniques are generally advantageous due to their inherent reproducibility and lower variance. The no-reference techniques are dependent on operator usage and may not necessarily indicate equipment faults. For example, rapid slewing or mode changes may cause degradation based on usage and not based on inherent equipment capabilities.

$\Delta I_{camera}$ accounts for the negative effects of excessive camera motion. $\Delta I_{contrast}$ modifies the interpretability output based on overall scene contrast. $\Delta I_{movers}$ modifies the interpretability output based on mover contrast and discontinuity. $\Delta I_{artifacts}$ modifies the interpretability output based on image artifacts such as blockiness due to compression and transmission errors.

For conversion of National Television System Committee (NTSC) formatted video, luminance values may be determined according to Equation 2:

$$L=0.2989\,R+0.5870\,G+0.1140\,B \qquad \text{[Eqn. 2]}$$

For Digital high density (HD) formatted video, luminance values may be determined according to Equation 3:

$$L=0.2126*R+0.7152*G+0.0722*B \qquad \text{[Eqn. 3]}$$

If the input luminance values are restricted to a range of 15-235 (e.g., video swung), they shall then be converted a "full swing" range of 0-255.

In particular embodiments of the disclosure, the system 100 chooses a perceptual analysis window to select the salient features using phase congruency. Phase congruency is typically not sensitive to variations in image illumination, blurring, and magnification. The phase congruency image is obtained from the intensity image, "iraw" according to Equation 4:

$$\text{icon}=\text{phasecongmono(iraw)} \qquad \text{[Eqn. 4]}$$

The Perceptual analysis window may be chosen according to one or more criteria, such as those listed below:

The minimum size in either height or width dimension is 256.

The perceptual analysis window shall have the same width to height ratio as the entire frame.

Both horizontal and vertical dimensions of the perceptual analysis window shall be a multiple of 32.

Nine, possibly overlapping, candidate windows shall be evaluated around frame center with offsets 20% of overall frame height and center, respectively.

Phase congruency shall be calculated for each candidate window and summed over rows and columns.

The candidate window with the greatest sum may be selected for additional analysis. Two features may be calculated from the phase congruency image, namely the mean of the phase congruency image, and the entropy of the phase congruency image. Also, according to particular configurations, the analysis frame rate (A-FPS) shall be greater than 20% of the sample frame rate. For example using a 30 FPS video, the analysis frame rate (A-FPS) shall be greater than 6 Hz, that is, no less than every 5th frame shall be analyzed. In certain cases, the time between analysis frames may be constrained to be less than 1.0 seconds. A-FPS shall be set equal to FPS when waves and or similar textures (e.g., trees in the wind) are analyzed to prevent background motion from being interpreted as artifact noise.

Ground Sample Distance (GSD) Calculation

In particular configurations, the system 100 calculates the GSD from metadata associated with the image. In certain cases, the GSD related metadata may be re-sampled to be frame synchronous to achieve relatively good accuracy. As an example, a 10% error in GSD can cause a 3% error in Video NIIRS quality level at the benchmark case of 230 mm (Video-NIIRS=5). As another example, a 10% error in GSD at Video-NIIRS=8 can cause a 2% error in Video NIIRS. A 10% GSD error can be as little as 3.0 millimeters. The parameters included in the metadata used to calculate the GSD include a slant range, a horizontal view angle, a vertical view angle, and a principal axis elevation angle relative to a local horizontal plane.

The GSD may be calculated according to Equation 5:

$$GSD = 2R\sqrt{\frac{\tan\left(\frac{\pi\theta_h}{360}\right)\tan\left(\frac{\pi\theta_v}{360}\right)}{\sin(\alpha)}} \qquad \text{[Eqn. 5]}$$

Where R is the "slant range" in meters, $\theta_h$ is the horizontal field of view in degrees, $\theta_v$ is the vertical field of view in degrees, and α is the sensor principal axis elevation angle relative to local horizontal plane in radians, computed using procedure outlined in UAS Local Dataset, STD 0601.05.

Relative Edge Response (RER) Instantaneous Measurement

The cumulative blurring due to the atmosphere and image chaining can be a primary cause of video degradation. The RER coefficient as described above quantifies these effects. The RER coefficient may be calculated manually when a slanted-edge reference is available using a blur metric according to the ISO 12233:2000 specification.

For automatic RER estimation with no available reference, however, the RER coefficient may be calculated according to a blind blur metric (BM) of the image, an edge intensity (EI) of the image, a perceptual RER (pRER) of the image, and a frequency ratio (FR) of the image as shown in Equations 6 through 9:

$$RER(BM)=1.17-1.15*BM \qquad [Eqn.~6]$$

$$RER(EI)=-0.28+1.3*(EI/100)^{(1/4)} \qquad [Eqn.~7]$$

$$RER(pRER)=0.10+0.55*pRER \qquad [Eqn.~8]$$

$$RER(FR)=-0.26+3*(FR)^{(1/4)} \qquad [Eqn.~9]$$

The no-reference RER estimate is the average of the four individual RER estimates as shown in Equation 10:

$$RER=(RER(BM)+RER(EI)+RER(pRER)+ER(FR))/4 \qquad [Eqn.~10]$$

The combined estimate has a standard deviation of error of approximately 0.1 for normal scene content with sufficient spatial energy. An RER error of 0.1 equates to 0.25 Video NIIRS error. A special intermittent error condition can occur when the scene does not contain any spatial energy such as sky, smooth water, or featureless desert. In this case, the instantaneous RER estimate may be erroneously low; however, this temporary condition will be detected and filtered out in subsequent processing using any suitable filtration technique.

The blur metric may be estimated using any suitable technique. One example technique is described in Crété-Roffet F., Dolmiere T., Ladret P., Nicolas M, "The Blur Effect: Perception and Estimation with a New No-Reference Perceptual Blur Metric," SPIE Proc. 6492 (2007).

The edge intensity (EI) may be calculated according to Equation 11:

$$EI = \frac{1}{RC}\sum_{i,j} \sqrt{g(i,j)_x^2 + g(i,j)_y^2}, \qquad [Eqn.~11]$$

where, $g_x$ and $g_y$ are the Sobel horizontal and vertical filtered versions of the input image.

Perceptual-RER is a blind technique that uses phase congruency and morphological operations to estimate the edge response. One example of matlab code for such an operation is provide below:

```
function RER=perceptual_RER(iraw)
%function RER=perceptual_RER(iraw)
%function takes input an intensity image
%and computes the Relative Edge Response
% estimate of the slope
%of the line spread function.
%estimate RER on original image
r1=RERpoly(iraw) ;
%downsample and repeat
r2=RERpoly(blur(iraw,l) ) ;
%use ratio to make non-linear adjustment
r=r1/r2;
RER=(r1*(2/r)^3).^(2/r) ;
%%%%%%%%%%%%%%%%%%%%%%%%%%%%%%%%%%%%%%%%%%%
function rer=RERpoly(iraw)
PSF = fspecial('gaussian',10,10) ; %define a blurring function
iraw2=imfilter(iraw,PSF,'conv') ; %smooth the input image
icon=phasecongmono(iraw2) ;% compute phase congruency image
se=strel('square',3) ; %parameter for erode
iconc=imerode(icon,se) ; %reduce false hits
icond=imdilate(iconc,se) ; %re-enlarge
i2=iraw(1:size(icond,1) ,1:size(icond,2) ) ; %select original pixels
ym=icond.*double (i2) ; %convert to double
ymz=sort(ym(:) ) ; %sort intensities
idx=find(ymz) ; %find non-zero entries
ymzz=ymz(idx) ; % select non-zero entries
idx=find(ymzz~=255) ; %remove repeating entries
yms=ymzz(idx) ; %select non-repeating limit entries
[ymin xmini] =min (yms) ; %find min and location
[ymax xmaxi] =max (yms) ; %find max and location
xwi=xmaxi-xmini; %calculate width
xci=xmini+round(xwi/2) ; %calculate center
ib=xci-round(xwi/4) ; %select interval for linear fit
ie=xci+round(xwi/4) ; %
p=polyfit(ib:ie,yms(ib:ie) ',1) ; %perform fit
rer=p(1)*length(ib:ie)/2.5; % estimate RER
```

The Frequency Ratio (FR) is calculated according to the ratio of high-pass to low-pass energy in the image. In one embodiment, a cut-off frequency of 0.15 can be used. One example of matlab code for such an operation is shown below.

```
function fr=frequency_ratio(img,Nsub,fcut)
%img input image
%Nsub size of sub region around center point, should be pow of 2
%fcut is the lowpass frequency cutoff
% Get the size of img
[r c k] = size(img) ;
rcenter=round(r/2) ;
ccenter=round(c/2) ;
%extract sub region and convert to intensity
simg=(img(round(rcenter-Nsub/2:rcenter+Nsub/2-1),round(ccenter-Nsub/2:ccenter+Nsub/2-1) , : ) ) ;
%compute fft of subimage
simgF=fftshift(fft2(simg) ) ;
FM=real(simgF.*conj(simgF) ) ;
%subselect low frequency part
fcuti=round(fcut*Nsub) ;
1pass=sum(sum(FM(Nsub/2-fcuti:Nsub/2+fcuti-1,Nsub/2-fcuti:Nsub/2+fcuti-1) ) ) ;
sall=sum(sum(FM) ) ;
hpass=sall-1pass;
fr=hpass/1pass;
%%%keyboard
edge_intensity.m
function outval = edge_intensity(img)
% OUTVAL = EDGE_INTENSITY(IMG)
if nargin == 1
img = double(img) ;
   % Create horizontal sobel matrix
   w = fspecial('sobel') ;
   % Get the size of img
   [r c k] = size(img) ;
   gx = imfilter(img,w,'replicate') ;
   gy = imfilter(img,w','replicate') ;
   for m= 1 : r
      for n = 1 : c
         for q = 1 : k
            g(m, n,q) = sqrt(gx(m,n,q)*gx(m,n,q) + gy(m,n,q)*gy(m,n,q) ) ;
         end
      end
   end
```

```
  outval = mean(mean(mean(g) ) ) ;
else
  error('Wrong number of input!') ;
end
```

For a partial reference RER metric, at the source, each frame is divided into regions. Each region is analyzed for edge energy. Once a qualified, high-edge energy region is found, the blur is estimated. The location of the region and the blur value is sent. At the receiver a similar computation is performed. Comparison of the blur estimates indicates distortion in the channel.

Noise Measurement, Peak Signal to Noise Ratio (PSNR)

When a reference is available, a standard PSNR metric may be used. Standard PSNR is defined via a mean squared error (MSE) which for two m×n monochrome images I and K where one of the images is considered a noisy approximation of the other according to Equation 12:

$$MSE = \frac{1}{mn}\sum_{i=0}^{m-1}\sum_{j=0}^{n-1}[I(i,j) - K(i,j)]^2 \quad \text{[Eqn. 12]}$$

Standard PSNR is defined according to Equation 13:

$$PSNR = 10*\log 10(MAXi/MSE) \quad \text{[Eqn. 13]}$$

where $MAX_i$ is the maximum possible pixel value of the image. When the pixels are represented using 8 bits per sample, $MAX_i$ is set to 255.

When no reference is available, the PSNR coefficient is calculated by applying a weighted sum to a feature vector and its pairwise components. Additional accuracy can be gained by averaging over multiple frames. The feature vector may have any number and type of characteristics of the image. In one embodiment, the feature vector has the following eleven elements:

V(1)=Fr=frequency_ratio(iraw,256,fc)
V(2)=BM=blurMetric(iraw);%blur metric,
V(3)=Evar=evar(iraw);
V(4)=MICON=mean(mean(icon));
V(5)=EICON=entropy(icon);
V(6)=EI=edge_intensity(iraw);
V(7)=STD=std(double(iraw(:))); standard deviation of intensity
V(8)=MSSIM=SSIM using stabilization
V(9)=LAMD=lamd;
V(10)=BLOCKV=r;
V(11)=GM=sum(abs(TCUM));

Each of these is generally described in the Table 2:

TABLE 2

Description of PSNR Features

| No. | Long Name | 4-letter code | General Reference |
|---|---|---|---|
| 1 | Frequency Ratio | FREQ | Mathworks Video Toolbox |
| 2 | Blur Metric | BLUR | Crété-Roffet F., Dolmiere T., Ladret P., Nicolas M, "The Blur Effect: Perception and Estimation with a New No-Reference Perceptual Blur Metric", SPIE Proc. 6492,, (2007) |
| 3 | Evar | EVAR | Garcia, D. CRCHUM, University of Montreal Hospital available online at: http://www.biomecardio.com/matlab |
| 4 | Mean of Phase Congruency | MICO | Peter Kovesi, "Image Features From Phase Congruency". Videre: A Journal of Computer Vision Research. MIT Press. Volume 1, Number 3, Summer 1999 http://mitpress.mit.edu/e-journals/Videre/001/v13.html (also see http://www.csse.uwa.edu.au/~pk/Research/research.html for matlab code) |
| 5 | Entropy of Phase Congruency | EICO | Peter Kovesi, "Image Features From Phase Congruency". Videre: A Journal of Computer Vision Research. MIT Press. Volume 1, Number 3, Summer 1999 http://mitpress.mit.edu/e-journals/Videre/001/v13.html (also see http://www.csse.uwa.edu.au/~pk/Research/research.html for matlab code) |
| 6 | Edge Energy | EDGE | Common image quality metric |
| 7 | Standard Deviation | STDR | Common image quality metric |
| 8 | SSIM of Stabilized Reference | SSIM | Z. Wang, A. C. Bovik, H. R. Sheikh and E. P. Simoncelli, "Image quality assessment: From error visibility to structural similarity," IEEE Transactions on Image Processing, vol. 13, no. 4, pp. 600-612, April 2004. https://ece.uwaterloo.ca/~z70wang/research/ssim/ssim_index.m |
| 9 | SSIM Derived Feature | LAMD | Described infra |
| 10 | Vertical Blocking | VBLK | Described infra |
| 11 | Global Motion Trend Component | TCUM | "Video Stabilization and Enhancement", Hany Farid, Jeffrey B. Woodward, Dartmouth TR2007-605 |

The eleven features and their pairwise combinations are combined to produce the following no-reference PSNR estimate according to the Equation 14:

$$PSNR_k = c(1) + \sum_{n=1}^{n=11} f_k(n)*c(n+1) + \sum_{j=1}^{f=11}\sum_{i=j+1}^{i=11} c(jvec(j)+i-j)*f_k(i)*f_k(j) \quad \text{(Eqn. 14)}$$

where jvec is defined as a vector of the following numbers: [13 23 32 40 47 53 58 62 65 67], and $f_k(n)$ notates the nth element of the PSNR feature vector for the kth video frame.

The number of coefficients is n(n−1)/2+n+1. In configurations in which the number of elements (n)=11, there are 67 coefficients. The coefficients generated according to the elements above and their range are provided in Table 3 below.

TABLE 3

Range of PSNR Coefficients

| Coeff. No. | Neg. Limit % | PSNR % ERROR For neg. shift | Pos. Limit % | PSNR % ERROR For pos. shift |
|---|---|---|---|---|
| 1 | −5 | 6.1713 | 5 | 6.1712 |
| 2 | −20 | 3.9361 | 25 | 4.9202 |
| 3 | −10 | 5.7429 | 10 | 5.743 |
| 4 | −20 | 0.0015358 | 25 | 0.0018168 |
| 5 | −5 | 4.8514 | 5 | 4.8513 |
| 6 | −5 | 6.201 | 5 | 6.201 |
| 7 | −15 | 5.9926 | 15 | 5.9927 |
| 8 | −20 | 0.44434 | 25 | 0.55535 |
| 9 | −20 | 1.2051 | 25 | 1.5063 |
| 10 | −20 | 0.13945 | 25 | 0.17406 |
| 11 | −20 | 0.82862 | 25 | 1.0358 |
| 12 | −20 | 0.61335 | 25 | 0.7666 |
| 13 | −15 | 5.3712 | 15 | 5.3712 |
| 14 | −20 | 0.0011473 | 25 | 0.001148 |
| 15 | −20 | 1.2293 | 25 | 1.5366 |
| 16 | −20 | 5.0492 | 25 | 6.3116 |
| 17 | −20 | 0.12395 | 25 | 0.15502 |
| 18 | −20 | 0.31864 | 25 | 0.39838 |
| 19 | −20 | 1.5895 | 25 | 1.9868 |
| 20 | −20 | 0.14754 | 25 | 0.18417 |
| 21 | −20 | 0.072005 | 25 | 0.090071 |
| 22 | −20 | 0.38404 | 25 | 0.48013 |
| 23 | −20 | 0.0011685 | 25 | 0.0011613 |
| 24 | −15 | 5.5196 | 15 | 5.5197 |
| 25 | −5 | 4.723 | 5 | 4.7229 |
| 26 | −10 | 5.592 | 10 | 5.5919 |
| 27 | −20 | 6.698 | 20 | 6.698 |
| 28 | −10 | 6.2678 | 10 | 6.2678 |
| 29 | −20 | 0.25202 | 25 | 0.31478 |
| 30 | −20 | 0.021297 | 25 | 0.026526 |
| 31 | −20 | 0.76334 | 25 | 0.9541 |
| 32 | −20 | 0.0016445 | 25 | 0.0019451 |
| 33 | −20 | 0.0033734 | 25 | 0.0041129 |
| 34 | −20 | 0.0011585 | 25 | 0.0011487 |
| 35 | −20 | 0.0011537 | 25 | 0.001211 |
| 36 | −20 | 0.0012055 | 25 | 0.0012939 |
| 37 | −20 | 0.00114 | 25 | 0.0011454 |
| 38 | −20 | 0.0011411 | 25 | 0.0011432 |
| 39 | −20 | 0.0011438 | 25 | 0.0011368 |
| 40 | −20 | 4.9402 | 25 | 6.1754 |
| 41 | −20 | 1.2898 | 25 | 1.6122 |
| 42 | −15 | 5.7818 | 15 | 5.7819 |
| 43 | −20 | 1.4069 | 25 | 1.7586 |
| 44 | −20 | 0.44529 | 25 | 0.55637 |
| 45 | −20 | 0.98876 | 25 | 1.236 |
| 46 | −20 | 0.88074 | 25 | 1.1008 |
| 47 | −10 | 4.8382 | 10 | 4.8382 |
| 48 | −15 | 6.9362 | 15 | 6.9361 |
| 49 | −15 | 6.3815 | 15 | 6.3814 |
| 50 | −20 | 0.79475 | 25 | 0.99319 |
| 51 | −20 | 1.0805 | 25 | 1.3506 |
| 52 | −20 | 2.3491 | 25 | 2.9365 |
| 53 | −20 | 3.1898 | 25 | 3.9872 |
| 54 | −20 | 2.5679 | 25 | 3.2099 |
| 55 | −20 | 0.072555 | 25 | 0.090451 |
| 56 | −20 | 1.0348 | 25 | 1.2934 |
| 57 | −20 | 0.46436 | 25 | 0.58037 |
| 58 | −20 | 5.5431 | 25 | 6.9288 |
| 59 | −20 | 0.11738 | 25 | 0.14647 |
| 60 | −20 | 0.61283 | 25 | 0.76611 |
| 61 | −20 | 0.88472 | 25 | 1.106 |
| 62 | −20 | 0.056355 | 25 | 0.070201 |
| 63 | −20 | 0.34056 | 25 | 0.42563 |
| 64 | −20 | 0.84249 | 25 | 1.053 |
| 65 | −20 | 0.0019298 | 25 | 0.0021537 |
| 66 | −20 | 0.038169 | 25 | 0.047461 |
| 67 | −20 | 0.15851 | 25 | 0.19807 |

A mapping of the coefficient numbers to features and the pairwise features combinations is also provide in Table 4 below.

TABLE 4

Mapping of Coefficient Number to Features and Pairwise Feature Combinations

|  | FREQ | BLUR | EVAR | MICO | EICO | EDGE | STDR | SSIM | LAMD | VBLK | TCUM |
|---|---|---|---|---|---|---|---|---|---|---|---|
| FREQ | 2 | 13 | 14 | 15 | 16 | 17 | 18 | 19 | 20 | 21 | 22 |
| BLUR |  | 3 | 23 | 24 | 25 | 26 | 27 | 28 | 29 | 30 | 31 |
| EVAR |  |  | 4 | 32 | 33 | 34 | 35 | 36 | 37 | 38 | 39 |
| MICO |  |  |  | 5 | 40 | 41 | 42 | 43 | 44 | 45 | 46 |
| EICO |  |  |  |  | 6 | 47 | 48 | 49 | 50 | 51 | 52 |
| EDGE |  |  |  |  |  | 7 | 53 | 54 | 55 | 56 | 57 |
| STDR |  |  |  |  |  |  | 8 | 58 | 59 | 60 | 61 |
| SSIM |  |  |  |  |  |  |  | 9 | 62 | 63 | 64 |
| LAMD |  |  |  |  |  |  |  |  | 10 | 65 | 66 |
| VBLK |  |  |  |  |  |  |  |  |  | 11 | 67 |

Although only one PSNR coefficient file is shown, multiple PSNR coefficient files may be used as the motion imagery training set encompasses more situations. For example, a PSNR coefficient file may be generated for each type of image sensor due to the type and quality of imagery that it acquires.

If a partial reference is available, each frame is divided into multiple regions and each region analyzed for edge energy. Once a qualified, homogenous, low-edge energy region is found, the noise is estimated. The location of the region and the calculated noise value is transmitted to a receiver. When received by a receiver, a similar calculation is performed and compared with the noise estimate calculated at the transmitter to determine distortion in the channel in which the signal is transmitted.

Camera MOTION and Scene Discontinuity, $\Delta I_{camera}$

Excessive camera motion and scene discontinuity ($\Delta I_{camera}$) between analysis frames can cause degradation or loss of interpretability. Scene translation discontinuity is defined according to Equation 15:

$$\Delta_{scene-xy} = (\text{A-FPS/FPS})(1/Fs) \quad [\text{Eqn. 15}]$$

where Fs is the fractional overlap between analysis frames. For example, if there is 50% overlap between the current frame and the previous analysis frame then Fs=0.5 and 1/Fs=2. If the analysis frames are 5 video frames apart then (A-FPS/FPS)=(1/5). For this example, $\Delta_{scene-xy}=2/5=0.4$.

In certain embodiments, calculation of scene overlap between analysis frames is not needed when the metadata indicates rapid slewing of the image. Otherwise, if the metadata test indicates substantial overlap, then global camera motion is measured between the current analysis window (iraw) and the previous analysis window (iraw_old) using a rigid model of rotation and translation.

Overall Scene Contrast and Dynamic Range, $\Delta I_{contrast}$

Overall Scene Contrast and Dynamic Range ($\Delta I_{contrast}$) is calculated by taking a histogram of the analysis frame. If the 80% percentile point is above the intensity value of 220, then instantaneous Video-NIIRS and the instantaneous Video Quality shall be set to zero. If the 80% percentile point is above the intensity value is less than 35, then instantaneous Video-NIIRS and the instantaneous Video Quality shall be set to zero. If the width of the histogram is narrow as measured by the 2nd moment then detail cannot be resolved. If the ointensity<15 (e.g., 8-bit imagery) then the instantaneous Video-NIIRS and the instantaneous video quality shall be set to zero. The values provided above are for 8-bit imagery. Appropriate adjustments shall be made for other bit depths.

Mover Contrast and Discontinuity $\Delta I_{movers}$

Mover Contrast and Discontinuity ($\Delta I_{movers}$) represents contrast and discontinuity of the imagery. If information concerning movers is available, it can be used to more accurately gauge the interpretability. If this information, or equivalent, is not available, $\Delta I_{movers}$ can be set to zero. Mover contrast and discontinuity is grouped together because the detection limit depends on size, speed, and contrast.

The mean modulation contrast surrounding the mover is computed in at least 4 directions as shown in equations 16 and 17:

$$Cm = |\overline{Lout} - \overline{Lin}|/(\overline{Lout} + \overline{Lin}), \quad [\text{Eqn. 16}]$$

where, $$\overline{Lout} = \frac{1}{K}\sum_{1}^{K} Lout(k), \quad [\text{Eqn. 17}]$$

and $$\overline{Lin} = \frac{1}{K}\sum_{1}^{K} Lin(k)$$

where Cm is the mover contrast and Lout and Lin are the gamma-corrected pixel luminance values inside and outside the mover contour.

The threshold contrast is predicted by equation 18 in which R-squared=0.98:

$$Ct = \text{abs}(0.184/(\text{sqrt}(x0) + -0.8817*x1/(363.54 + (158.91+x1)/x0)) - 0.02383) \quad [\text{Eqn. 18}]$$

Where x0 is the target size in pixels and x1 is the target speed in pixels per-second. Equation 18 may be particularly useful in standard viewing conditions where the imagery is displayed at its native resolution on a device from a distance that does not degrade the ability to perceive the inherent detail.

If the measured contrast is less than the predicted threshold contrast based on the size and speed of the detected object, then the Video Interpretability is reduced according to the following: Define Cr=log 10(C/Ct) as the log of the ratio of the detected mover contrast to threshold, let N be number of detected movers with Cr less than 0.5, and δI equals an amount to add to the Video NIIRS estimate Regarding advanced pooling of interpretability, if all detected Movers have a Cr value greater than 0.5 then do not modify the interpretability estimate. If all detected Movers have a Cr value less than 0 reduce I by 1.0, that is δI=−1, otherwise δI=−N*0.2. For example, if one detected mover has Cr less than 0.5 δI=−0.2, if two detected movers have Cr less than 0.5 δI=−0.4, if three detected movers have Cr less than 0.5 δI=−0.6, and if four detected movers have Cr less than 0.5 δI=−0.8. In no case can Interpretability be less than 0.

Artifact Metrics

The structural similarity (SSIM) index is a method for measuring the similarity between two images. It is usually applied between an uncompressed reference image and the image being tested. However, a modified-SSIM (M-SSIM) metric applies the SSIM between the current analysis window and the previous analysis window that has been warped to match. This technique is not as sensitive as SSIM when used with a reference, and may detect transitory artifacts. If Video Moving Target Indicator (VMTI) amplifying data is available, movers are segmented and removed from the M-SSIM calculation.

A-FPS shall be set equal to FPS when imagery of waves and or similar textures are being analyzed to prevent background motion being interpreted as artifact noise. Before SSIM can be determined, the current analysis window size can be trimmed using any suitable trimming algorithm.

In some cases, burned in metadata can make M-SSIM estimates too low. Simple metadata removal is often not adequate for metadata that floats; that is, it neither is associated with the ground, or the camera.

The LAMBDA artifact metric is calculated by warping the previous analysis frame to the current analysis frame. Once the two frames are aligned, the PSNR is calculated between them using the current analysis frame as the reference. The size and location of the warped region can be adjusted to avoid burned-in metadata. Additional filtering can be provided to reduce the effect of floating metadata. The filtering ensures that only strong artifacts are registered. Otherwise, LAMBDA is set to zero.

If Video Moving Target Indicator (VMTI) amplifying data is available, movers are segmented and removed from the LAMBDA calculation. If VMTI information is not available, some other method shall be used to detect and remove mover energy from the LAMBDA estimate. A-FPS shall be set equal to FPS when imagery of waves and/or similar textures are being analyzed to prevent background motion from being interpreted as artifact noise.

Instantaneous global motion (GM) is feature 11 of the PSNR feature vector described above. The instantaneous global motion (GM) may be determined according to Equation 19:

$$GM = \text{sum}(\text{abs}(Tcum)) \quad [\text{Eqn. 19}]$$

The blockiness is calculated using multiple adjacent video frames to obtain 8192 samples for frequency analysis. The blockiness metric is the ratio of the energy in the frequency bin corresponding to the most common sub-multiple macroblock size of 8-pixels, to the average value of the nearby frequency bins. For 720×1080 format video at least eight frames are needed to compute the vertical blockiness (VBLK). Twelve frames are needed to compute the horizontal blockiness (HBLK). The blockiness calculation is described in the following ten steps. The p1 parameter in (p1/p2) notation is for computing vertical blockiness, the p2 number is for horizontal blockiness calculations:

1) for the mth input irawm frame compute the edges using a Sobel operator and a threshold of 0.005 to give on output image denoted by em;
2) perform morphological filter operation on em to eliminate (vertical/horizontal) artifacts:

$$er_m = imeroded(e_m, se);\quad\quad\text{[Eqn. 20]}$$

where the structural element for the morphological operation is given by:
se=strel('line',7,0); for VBLK
se=strel('line',7,90); for HBLK 3) convert the edge, and morphologically processed image to a vector by summing along (columns/rows):

$$ers_m(k) = \frac{1}{H}\sum_{j=1}^{j=H} er_m(j,k)\ \text{sum columns for VBLK}\quad\text{[Eqn. 21]}$$

$$ers_m(k) = \frac{1}{H}\sum_{j=1}^{j=W} er_m(k,j)\ \text{sum rows for HBLK};\quad\text{[Eqn. 22]}$$

where H is the total number of rows, and W is the total number of columns;

4) concatenate multiple ers vectors to form ibuf of length at least 8192:

$$ibuf=[ers1\ ers2\ \ldots\ ers_m\ \ldots\ ersM];\quad\text{[Eqn. 23]}$$

5) compute the power spectrum of ibuf using the well known Welch method with a normalized boxcar window of length 2048:

$$Pxx=Pwelch(ibuf, window);$$

$$window=ones(1,2048)/2048;\quad\text{[Eqn. 24]}$$

6 & 7) convert to dB and detrend:

$$Pxxd=detrend(10*\log 10(Pxx));\quad\text{[Eqn. 25]}$$

8) Compute the blocking energy in the macroblock bin:

$$Energyblocking\_ = Pxxd(2*Np/16);\ \text{where}\ Np=8192\quad\text{[Eqn. 26]}$$

9) Compute the average floor energy in nearby bins:

$$Energyfloor = \left(\frac{1}{N_{Floor}}\right)\sum_{k=ibin+.04*Np}^{k=ibin+.05*Np} Pxxd(k)\quad\text{[Eqn. 27]}$$

10) Blockiness metric is the difference between the Energyblocking and Energyfloor:

$$Blockiness = Energy_{blocking} - Energy_{floor}\quad\text{[Eqn. 28]}$$

In some embodiments, the metrics described above are used to predict PSNR and are not included in Δartifacts. Δartifacts may be reserved for future use to describe the effects of packet loss and inclusion of additional metadata such as encoder PSNR, and decoder error message. Thus, Δartifacts can be set to zero in particular embodiments.

Video Quality

The video quality is assigned one of five values corresponding to BAD, POOR, FAIR, GOOD, or EXCELLENT. The probability of each value is estimated by calculating a feature vector and applying appropriate coefficients as shown in the following equations:

$$Pr(Y_i=1(BAD))\frac{\exp(\beta_1\cdot X_i)}{1+\sum_{k=1}^{K-1}\exp(\beta_k\cdot X_i)}\quad\text{[Eqn. 29]}$$

$$Pr(Y_i=2(POOR))\frac{\exp(\beta_2\cdot X_i)}{1+\sum_{k=1}^{K-1}\exp(\beta_k\cdot X_i)}\quad\text{[Eqn. 30]}$$

$$Pr(Y_i=3(FAIR))\frac{\exp(\beta_3\cdot X_i)}{1+\sum_{k=1}^{K-1}\exp(\beta_k\cdot X_i)}\quad\text{[Eqn. 31]}$$

$$Pr(Y_i=4(GOOD))\frac{\exp(\beta_4\cdot X_i)}{1+\sum_{k=1}^{K-1}\exp(\beta_k\cdot X_i)}\quad\text{[Eqn. 32]}$$

$$Pr(Y_i=5(EXCELLENT))\frac{1}{1+\sum_{k=1}^{K-1}\exp(\beta_k\cdot X_i)}\quad\text{[Eqn. 33]}$$

$X_i$ is a feature vector for the ith frame. $Y_i$ is the estimated quality class for the ith frame. The class with the greatest probability is selected if it exceeds a minimum threshold probability. The minimum threshold probability, according to particular embodiments, shall be 0.70.

The description of the quality feature vector for the ith video freame is provided in the Table 5.

TABLE 5

Description of Quality Feature Vector X

| Number | Long Name | 4-letter code | General Reference |
|---|---|---|---|
| 1 | Frequency Ratio | FREQ | Mathworks Video Toolbox |
| 2 | Blur Metric | BLUR | Crété-Roffet F., Dolmiere T., Ladret P., Nicolas M, "The Blur Effect: Perception and Estimation with a New No-Reference Perceptual Blur Metric", SPIE Proc. 6492,, (2007) |
| 3 | Evar | EVAR | Garcia, D. CRCHUM, University of Montreal Hospital available online at: http://www.biomecardio.com/matlab |
| 4 | Mean of Phase Congruency | MICO | Peter Kovesi, "Image Features From Phase Congruency". Videre: A Journal of Computer Vision Research. MIT Press. Volume 1, Number 3, Summer 1999 http://mitpress.mit.edu/e-journals/Videre/001/v13.html (also see http://www.csse.uwa.edu.au/~pk/Research/research.html for matlab code) |

TABLE 5-continued

Description of Quality Feature Vector X

| Number | Long Name | 4-letter code | General Reference |
|---|---|---|---|
| 5 | Entropy of Phase Congruency | EICO | Peter Kovesi, "Image Features From Phase Congruency". *Videre: A Journal of Computer Vision* Research. MIT Press. Volume 1, Number 3, Summer 1999 http://mitpress.mit.edu/e-journals/Videre/001/v13.html (also see http://www.csse.uwa.edu.au/~pk/Research/research.html for matlab code) |
| 6 | Edge Energery | EDGE | Common image quality metric |
| 7 | Standard Deviation | STDR | Common image quality metric |
| 8 | SSIM of Stabilized Reference | SSIM | Z. Wang, A. C. Bovik, H. R. Sheikh and E. P. Simoncelli, "Image quality assessment: From error visibility to structural similarity," *IEEE Transactions on Image Processing*, vol. 13, no. 4, pp. 600-612, April 2004. https://ece.uwaterloo.ca/~z70wang/research/ssim/ssim index.m |
| 9 | SSIM Derived Feature | LAMD | Described infra |
| 10 | Vertical Blocking | VBLK | Described infra |
| 11 | Perceptual RER | PRER | Described infra |
| 12 | Global Motion Trend Component | TCUM | "Video Stabilization and Enhancement", Hany Farid, Jeffrey B. Woodward, Dartmouth TR2007-605 |

The range of quality efficient is generally described in Table 6:

TABLE 6

Video Quality Multinomial Logistic Likert Coefficents and Their Range.

| No. | Multinomial Logistic Coefficients ("beta" in probability equation) | | | | Feature Description | Range |
|---|---|---|---|---|---|---|
| 0 | 2.2372 | 3.5973 | 4.7296 | 1.0965 | constant term | plus/minus 50% |
| 1 | 65.931 | 95.154 | 50.395 | 120.82 | frequency_ratio (iraw, 256, fc); | plus/minus 50% |
| 2 | 8.865 | 10.885 | 12.388 | 10.187 | blurMetric (iraw); % blur metric | plus/minus 50% |
| 3 | 0.39482 | 0.38715 | 0.039475 | 0.89175 | evar (iraw); | plus/minus 50% |
| 4 | −1408 | 744.72 | 193.23 | 406.03 | mean (mean (icon)); | plus/minus 50% |
| 5 | 23.268 | 19.658 | 9.5779 | 4.516 | entropy (icon); | plus 50% minus 5% |
| 6 | 0.075755 | 0.23649 | 0.2627 | 0.0731 | edge_intensity (iraw); | plus 5% minus 50% |

In step 212, the estimation system determines the interpretability or quality value using the process described above. In step 214, the estimation system outputs the interpretability or quality value associated with the image.

The previously described process may continue to process the image throughout its duration. For example, the interpretability or quality value may continually change during playback of the image such that some segments of the image have a higher level of interpretability or quality than at other segments of the image. The system continually monitors the image and associates an ongoing, updated value with each portion of the image for interpretation by users of the system 100. When use of the system 100 is no longer needed or desired, the process ends in step 216.

Although FIG. 2 illustrates one example process 200 for determining an interpretability value for an image, various changes may be made to FIG. 2. For example, the various steps described herein could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Appendix A, which is attached and is authored by the inventor of the present application, provides additional details of this disclosure.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A video interpretability and quality estimation method comprising:
   determining that a reference image for a current image or frame is not available;
   generating an interpretability estimate for the current image or frame using one or more feature characteristics of the current image or frame; and
   at least one of: outputting or storing the interpretability estimate;
   wherein the interpretability estimate is based on:
   a difference between (i) a value of noise content at a critical point at which interpretability is substantially degraded and (ii) a value of noise content within the current image or frame; and
   at least one feature vector that aligns a previous image or frame to the current image or frame using warping.

2. The method of claim 1, wherein the interpretability estimate is generated using a formula of:

$$I_k = K\text{constant} - \log_2(GSD_k) - \log_2(1/RER_k) - \exp(D\text{constant}*(PSNR_c - PSNR_k))$$

where:
   $I_k$ is the interpretability estimate for a $k^{th}$ image or frame,
   Kconstant is a constant value used to map the interpretability estimate to a standardized specification,
   $GSD_k$ is a geometric mean of horizontal and vertical components at a center of the $k^{th}$ image or frame,
   $RER_k$ is a measure of sharpness of the $k^{th}$ image or frame,
   Dconstant is a digital cliff constant,
   $PSNR_c$ is the value of noise content at the critical point at which interpretability is substantially degraded, and
   $PSNR_k$ is the value of noise content within the $k^{th}$ image or frame.

3. The method of claim 1, wherein the interpretability estimate is generated using a formula of:

$$I_k = K\text{constant} - \log_2(GSD_k) - \log_2(1/RER_k) - \exp(D\text{constant}*(PSNR_c - PSNR_k)) - \Delta I_{camera} - \Delta I_{contrast} - \Delta I_{movers} - \Delta I_{artifacts}$$

where:
   $I_k$ is the interpretability estimate for a $k^{th}$ image or frame,
   Kconstant is a constant value used to map the interpretability estimate to a standardized specification,
   $GSD_k$ is a geometric mean of horizontal and vertical components at a center of the $k^{th}$ image or frame,
   $RER_k$ is a measure of sharpness of the $k^{th}$ image or frame,
   Dconstant is a digital cliff constant,
   $PSNR_c$ is the value of noise content at the critical point at which interpretability is substantially degraded,
   $PSNR_k$ is the value of noise content within the $k^{th}$ image or frame,
   $\Delta I_{camera}$ accounts for negative effects of excessive camera motion,
   $\Delta I_{contrast}$ modifies the interpretability estimate based on overall scene contrast,
   $\Delta I_{movers}$ modifies the interpretability estimate based on mover contrast and discontinuity, and
   $\Delta I_{artifacts}$ modifies the interpretability estimate based on image artifacts.

4. The method of claim 1, wherein the at least one feature vector is based on a structural similarity (SSIM) between the warped previous image or frame and the current image or frame.

5. The method of claim 1, wherein the interpretability estimate is also based on a relative edge response (RER) that is calculated according to a blind blur metric (BM) of the current image or frame, the RER generated using a formula of:

$$RER(BM) = 1.17 - 1.15*BM.$$

6. The method of claim 1, wherein the interpretability estimate is also based on a relative edge response (RER) that is calculated according to an edge intensity (EI) of the current image or frame, the RER generated using a formula of:

$$RER(EI) = -0.28 + 1.3*(EI/100)^{\wedge}(1/4).$$

7. The method of claim 1, wherein the interpretability estimate is also based on a relative edge response (RER) that is calculated according to a perceptual RER (pRER) of the current image or frame, the RER generated using a formula of:

$$RER(pRER) = 0.10 + 0.55*pRER.$$

8. The method of claim 1, wherein the interpretability estimate is also based on a relative edge response (RER) that is calculated according to a frequency ratio (FR) of the current image or frame, the RER generated using a formula of:

$$RER(FR) = -0.26 + 3*(FR)^{\wedge}(1/4).$$

9. The method of claim 1, wherein the interpretability estimate is also based on a relative edge response (RER) that is calculated as an average of at least two of:
   an RER calculation based on a blind blur metric (BM),
   an RER calculation based on an edge intensity (EI),
   an RER calculation based on a perceptual RER (pRER), and
   an RER calculation based on a frequency ratio (FR).

10. The method of claim 1, wherein the interpretability estimate is also based on a determination of a blockiness of the current image or frame.

11. The method of claim 1, wherein the interpretability estimate is also based on a threshold contrast that is generated using a formula of:

$$Ct = \text{abs}(0.184/(\text{sqrt}(x0)+-0.8817*x1/(363.54+(158.91+x1)/x0))-0.02383)$$

where:
   Ct is the threshold contrast;
   x0 is a target size in pixels, and
   x1 is a target speed in pixels per second.

12. The method of claim 1, wherein the value of noise content within the current image or frame is generated using a formula of:

$$PSNR_k = c(1) + \sum_{n=1}^{n=11} f_k(n)*c(n+1) + \sum_{j=1}^{j=11} \sum_{i=j+1}^{i=11} c(jvec(j)+i-j)*f_k(i)*f_k(j)$$

where:
   $PSNR_k$ is the value of noise content within a $k^{th}$ image or frame;
   jvec is a vector of [13 23 32 40 47 53 58 62 65 67], and $f_k(n)$ is an $n^{th}$ element of a PSNR feature vector comprising a plurality of features and their respective pairwise combinations for the $k^{th}$ image or frame.

13. The method of claim 1, wherein:
the interpretability estimate is based on a plurality of feature vectors, and each feature vector has at least five of:
V(1)=Fr=frequency_ratio(iraw,256,fc)
V(2)=BM=blurMetric(iraw); %blur metric,
V(3)=Evar=evar(iraw);
V(4)=MICON=mean(mean(icon));
V(5)=EICON=entropy(icon);
V(6)=EI=edge_intensity(iraw);
V(7)=STD=std(double(iraw(:))); standard deviation of intensity
V(8)=MSSIM=SSIM using stabilization
V(9)=LAMD=lamd;
V(10)=BLOCKV=r;
V(11)=GM=sum(abs(TCUM)),
where:
iraw is an intensity image,
fc is a frequency cutoff,
Evar is a variance estimation,
icon is a phase congruency image,
SSIM is a structural similarity,
LAMD is a SSIM-derived feature,
BLOCKV is a vertical blockiness, and
TCUM is a global motion trend component.

14. The method of claim 1, further comprising:
determining that a partial reference image is available for a subsequent image or frame;
dividing the subsequent image or frame into regions;
analyzing each region for edge energy;
once a qualified high edge energy region is found, estimating a blur; and
providing a location of the qualified high edge energy region and the estimated blur.

15. The method of claim 1, further comprising:
determining that a partial reference image is available for a subsequent image or frame;
dividing the subsequent image or frame into regions;
analyzing each region for edge energy;
once a qualified high edge energy region is found, estimating a noise; and
providing a location of the qualified high edge energy region and the estimated noise.

16. A system comprising:
at least one processor; and
at least one memory that stores logic for video interpretability and quality estimation, the logic configured when executed to cause the at least one processor to:
determine that a reference image for a current image or frame is not available;
generate an interpretability estimate for the current image or frame using one or more feature characteristics of the current image or frame; and
at least one of: output or store the interpretability estimate;
wherein the interpretability estimate is based on:
a difference between (i) a value of noise content at a critical point at which interpretability is substantially degraded and (ii) a value of noise content within the current image or frame; and
at least one feature vector that aligns a previous image or frame to the current image or frame using warping.

17. The system of claim 16, wherein the logic is configured when executed to generate the interpretability estimate using a formula of:

$$I_k = K\text{constant} - \log_2(GSD_k) - \log_2(1/RER_k) - \exp(D\text{constant}*(PSNR_c - PSNR_k))$$

where:
$I_k$ is the interpretability estimate for a $k^{th}$ image or frame,
Kconstant is a constant value used to map the interpretability estimate to a standardized specification,
$GSD_k$ is a geometric mean of horizontal and vertical components at a center of the $k^{th}$ image or frame,
$RER_k$ is a measure of sharpness of the $k^{th}$ image or frame,
Dconstant is a digital cliff constant,
$PSNR_c$ is the value of noise content at the critical point at which interpretability is substantially degraded, and
$PSNR_k$ is the value of noise content within the $k^{th}$ image or frame.

18. The system of claim 16, wherein the logic is configured when executed to generate the interpretability estimate using a formula of:

$$I_k = K\text{constant} - \log_2(GSD_k) - \log_2(1/RER_k) - \exp(D\text{constant}*(PSNR_c - PSNR_k)) - \Delta I_{camera} \Delta I_{contrast} - \Delta I_{movers} \Delta I_{artifacts}$$

where:
$I_k$ is the interpretability estimate for a $k^{th}$ image or frame,
Kconstant is a constant value used to map the interpretability estimate to a standardized specification,
$GSD_k$ is a geometric mean of horizontal and vertical components at a center of the $k^{th}$ image or frame,
$RER_k$ is a measure of sharpness of the $k^{th}$ image or frame,
Dconstant is a digital cliff constant,
$PSNR_c$ is the value of noise content at the critical point at which interpretability is substantially degraded,
$PSNR_k$ is the value of noise content within the $k^{th}$ image or frame,
$\Delta I_{camera}$ accounts for negative effects of excessive camera motion,
$\Delta I_{contrast}$ modifies the interpretability estimate based on overall scene contrast,
$\Delta I_{movers}$ modifies the interpretability estimate based on mover contrast and discontinuity, and
$\Delta I_{artifacts}$ modifies the interpretability estimate based on image artifacts.

19. The system of claim 16, wherein the at least one feature vector is based on a structural similarity (SSIM) between the warped previous image or frame and the current image or frame.

20. The system of claim 16, wherein the logic is configured when executed to generate the interpretability estimate based on a relative edge response (RER) that is calculated according to a blind blur metric (BM) of the current image or frame, the logic configured when executed to generate the RER using a formula of:

$$RER(BM) = 1.17 - 1.15*BM.$$

21. The system of claim 16, wherein the logic is configured when executed to generate the interpretability estimate based on a relative edge response (RER) that is calculated according to an edge intensity (EI) of the current image or frame, the logic configured when executed to generate the RER using a formula of:

$$RER(EI) = -0.28 + 1.3*(EI/100)^{\wedge}(1/4).$$

22. The system of claim 16, wherein the logic is configured when executed to generate the interpretability estimate based on a relative edge response (RER) that is calculated according to a perceptual RER (pRER) of the current image or frame, the logic configured when executed to generate the RER using a formula of:

RER(pRER)=0.10+0.55*pRER.

23. The system of claim 16, wherein the logic is configured when executed to generate the interpretability estimate based on a relative edge response (RER) that is calculated according to a frequency ratio (FR) of the current image or frame, the logic configured when executed to generate the RER using a formula of:

RER(FR)=−0.26+3*(FR)^(1/4).

24. The system of claim 16, wherein the logic is configured when executed to generate the interpretability estimate based on a relative edge response (RER) that is calculated as an average of at least two of:
   an RER calculation based on a blind blur metric (BM),
   an RER calculation based on an edge intensity (EI),
   an RER calculation based on a perceptual RER (pRER), and
   an RER calculation based on a frequency ratio (FR).

25. The system of claim 16, wherein the logic is configured when executed to generate the interpretability estimate based on a determination of a blockiness of the current image or frame.

26. The system of claim 16, wherein the logic is configured when executed to generate the interpretability estimate based on a threshold contrast that is generated using a formula of:

$Ct=abs(0.184/(sqrt(x0)+−0.8817*x1/(363.54+(158.91+x1)/x0))−0.02383)$ where:
   Ct is the threshold contrast;
   x0 is a target size in pixels, and
   x1 is a target speed in pixels per second.

27. The system of claim 16, wherein the logic is configured when executed to generate the value of noise content within the current image or frame using a formula of:

$$PSNR_k = c(1) + \sum_{n=1}^{n=11} f_k(n)*c(n+1) + \sum_{j=1}^{j=11}\sum_{i=j+1}^{i=11} c(jvec(j)+i-j)*f_k(i)*f_k(j)$$

where:
   $PSNR_k$ is the value of noise content within a $k^{th}$ image or frame;
   jvec is a vector of [13 23 32 40 47 53 58 62 65 67], and
   $f_k(n)$ is an $n^{th}$ element of a PSNR feature vector comprising a plurality of features and their respective pairwise combinations for the $k^{th}$ image or frame.

28. The system of claim 16, wherein:
   the logic is configured when executed to generate the interpretability estimate based on a plurality of feature vectors, and
   each feature vector has at least five of:
      V(1)=Fr=frequency_ratio(iraw,256,fc)
      V(2)=BM=blurMetric(iraw); %blur metric,
      V(3)=Evar=evar(iraw);
      V(4)=MICON=mean(mean(icon));
      V(5)=EICON=entropy(icon);
      V(6)=EI=edge_intensity(iraw);
      V(7)=STD=std(double(iraw(:))); standard deviation of intensity
      V(8)=MSSIM=SSIM using stabilization
      V(9)=LAMD=lamd;
      V(10)=BLOCKV=r;
      V(11)=GM=sum(abs(TCUM)),
   where:
      iraw is an intensity image,
      fc is a frequency cutoff,
      Evar is a variance estimation,
      icon is a phase congruency image,
      SSIM is a structural similarity,
      LAMD is a SSIM-derived feature,
      BLOCKV is a vertical blockiness, and
      TCUM is a global motion trend component.

29. The system of claim 16, wherein the logic is configured when executed to cause the at least one processor to:
   determine that a partial reference image is available for a subsequent image or frame;
   divide the subsequent image or frame into regions;
   analyze each region for edge energy;
   once a qualified high edge energy region is found, estimate a blur; and
   provide a location of the qualified high edge energy region and the estimated blur.

30. The system of claim 16, wherein the logic is configured when executed to cause the at least one processor to:
   determine that a partial reference image is available for a subsequent image or frame;
   divide the subsequent image or frame into regions;
   analyze each region for edge energy;
   once a qualified high edge energy region is found, estimate a noise; and
   provide a location of the qualified high edge energy region and the estimated noise.

* * * * *